US012500915B1

(12) United States Patent
Chang et al.

(10) Patent No.: US 12,500,915 B1
(45) Date of Patent: Dec. 16, 2025

(54) GENERATION OF TARA-BASED IDPS RULES UTILIZING GENERATIVE ARTIFICIAL INTELLIGENCE

(71) Applicant: VicOne Corporation, Tokyo (JP)

(72) Inventors: Yao-Tang Chang, Taipei (TW); Yi-Hong Chu, Taipei (TW); Shih-Han Hsu, Taipei (TW); Chih-Sung Chen, Taipei (TW); Pei-Zhong Luo, Taipei (TW); Yi-Li Cheng, Taipei (TW)

(73) Assignee: VicOne Corporation, Tokyo (JP)

( * ) Notice: Subject to any disclaimer, the term of this patent is extended or adjusted under 35 U.S.C. 154(b) by 39 days.

(21) Appl. No.: 18/776,813

(22) Filed: Jul. 18, 2024

(51) Int. Cl.
*H04L 9/40* (2022.01)
*H04L 67/12* (2022.01)

(52) U.S. Cl.
CPC .......... *H04L 63/1425* (2013.01); *H04L 63/20* (2013.01); *H04L 67/12* (2013.01)

(58) Field of Classification Search
CPC ...... H04L 63/1425; H04L 63/20; H04L 67/12
See application file for complete search history.

(56) References Cited

U.S. PATENT DOCUMENTS

| 9,183,385 | B2 * | 11/2015 | Chapman | ............... | G06F 21/554 |
| 2018/0205754 | A1 * | 7/2018 | North | ............... | H04L 63/145 |
| 2019/0379682 | A1 * | 12/2019 | Overby | ............... | H04L 12/40 |
| 2020/0274851 | A1 * | 8/2020 | Qiao | ............... | H04L 63/0263 |
| 2022/0182408 | A1 * | 6/2022 | Jung | ............... | H04L 63/1466 |
| 2024/0236142 | A1 * | 7/2024 | Vanveerdeghem | ..... | H04L 63/20 |
| 2025/0103705 | A1 * | 3/2025 | Choi | ............... | G06F 21/554 |
| 2025/0307421 | A1 * | 10/2025 | Guo | ............... | G06F 21/566 |

FOREIGN PATENT DOCUMENTS

| CN | 120297271 | A | * | 7/2025 | | |
| WO | WO-2025052384 | A1 | * | 3/2025 | ......... | H04L 63/1408 |
| WO | WO-2025088602 | A1 | * | 5/2025 | ............ | B60W 10/00 |
| WO | WO-2025134112 | A1 | * | 6/2025 | ......... | H04L 63/1433 |

\* cited by examiner

*Primary Examiner* — Javier O Guzman
(74) *Attorney, Agent, or Firm* — Beyer Law Group LLP

(57) ABSTRACT

A large language model is trained by inputting a TARA configuration of an ECU of a connected vehicle, an EEA specification, and IDPS rules of the ECU. Software modules are used to extract feature vectors for input to the LLM. The LLM is fine tuned by further inputting later versions of the ECU and data from other ECUs of the vehicle. IDPS rules for another ECU of the vehicle which has no rules or few rules are generated by inputting the TARA configuration of the other ECU into the trained LLM and prompting the LLM to generate rules. The prompt may include instructions to minimize overhead on the other ECU, reduce rules within the vehicle, etc. The generated rules are output from the LLM and stored within the IDPS engine of the other ECU, stored on a computer, transmitted to another vehicle. Rules for two other ECUs may be generated.

20 Claims, 20 Drawing Sheets

Example TARA Configuration for Specific Threat Scenario

| Threat scena | Threat scenario | Attack Path ID | Attack path | | Attack feasibility level | Aggregated attack feasibility | Risk | | | | Risk treatment option | Risk treatment |
|---|---|---|---|---|---|---|---|---|---|---|---|---|
| | | | | | | | S | F | O | P | | |
| APP-14 | Masquerade as Legitimate Application | P7.3 | Attacker access by Hardware Additions AND send masquerade legitimate CAN ID AND send manipulated CAN data message to CANbus | A002D1 | High | High | 5 | 1 | 5 | 1 | Reduction | CAN anomaly detection engine be added to the CAN filtering system to analyze message frequency and payload anomalies |
| | | | | A002D2 | | | 1 | 1 | 5 | 1 | | |

FIG. 4B

EEA for ECU1                                         ← 400

```
{
  "ecus": [
    {
      "name": "ECU1",  ← 402
      "type": "Node",
      "securityFeatures": {
        "IDPS": "Enabled",
        "IDPSFeatures": ["CAN rule", "Network IPS rule", "System rule"]
      },
      "components": [  ← 404
        {
          "name": "Main Application",
          "description": "Handles core functionalities."
        },
        {
          "name": "Application Data",
          "description": "Stores operational data."
        },
        {
          "name": "IDPS Engine",
          "description": "Monitors CAN interface and applies security rules."
        }    ],
      "connections": [  ← 406
        {
          "type": "CAN",
          "connectedTo": "other ECUs",
          "interface": "CAN interface"    }    ]    },
```

FIG. 5A

EEA for ECU2  ← 410

```
{
    "name": "ECU2", ← 412
    "type": "Node",
    "securityFeatures": {
      "IDPS": "Enabled",
      "IDPSFeatures": ["CAN rule", "Network IPS rule", "System rule"]
    },
    "components": ← 414
[   {
      "name": "Main Application",
      "description": "Handles core functionalities."
    },
    {    "name": "Application Data",
      "description": "Stores operational data."     },
    {    "name": "IDPS Engine",
      "description": "Monitors Network interface and applies security rules."    }
],
    "connections": [    { ← 416
      "type": "Ethernet",
      "connectedTo": "other ECUs",
      "interface": "Network interface"    }   ]   ],
"networks": [  {
    "type": "CAN", ← 418
    "description": "Connects ECU1 to other ECUs for communication."
},
{    "type": "Ethernet",
    "description": "Connects ECU2 to other ECUs for high-speed data transfer."
} ]}
```

FIG. 5B

System Rule Schema

```
{"rule_id": "001",  ← 430
"description": "Block unauthorized network interface access attempts.",
"resource": "/network/interface",
"action": "execute",
"conditions": {
"user_role": "user" },
"effect": "block" }, { "rule_id": "002",  ← 432
"description": "Allow only administrators to modify network configurations.",
"resource": "/network/settings",
"action": "write",
"conditions": {
"user_role": "admin" },
"effect": "allow" }, { "rule_id": "003",  ← 434
"description": "Prevent unauthorized data transmission over CAN interface.",
"resource": "/can/data",
"action": "write",
"conditions": {
"user_role": "user",
"authentication_level": "low" },
"effect": "block" }, { "rule_id": "004",  ← 436
"description": "Detect and alert on potential DDoS attack patterns.",
"resource": "/network/traffic",
"action": "read",
"conditions": {
"traffic_pattern": "abnormal" },
"effect": "alert" }, { "rule_id": "005",  ← 438
"description": "Ensure secure transmission of telematics data.",
idps_rule_schema.md 2024-05-25
2 / 3
"resource": "/telematics/data",
"action": "write",
"conditions": {
"encryption": "none" },
"effect": "block" }
```

FIG. 6

Network IPS Rule Schema

```
{
"rule_id": 100001,              ← 450
"description":  "rule description...",
"protocol":  "tcp",
"source":  "any",
"source_port":  "any",
"destination":  "any",
"destination_port":  "any",
"message":  "...",
"conditions": {
"packet_size":  ""
...
},
"threshold": {
"type":  "threshold",
"track":  "by_dst",
"count":  100,
"seconds":  60
},
"sid":  100001,
"rev":  1
"action":  "detect/alarm/block"
}
```

FIG. 7

CAN Rule Schema

```
[ {
"rule_id": "001",  ← 462
"description": "Allow messages from trusted CAN IDs under normal
operating conditions.",
"action": "allow",
"conditions": {
"can_id": ["0x123", "0x456", "0x789"]
}
},
idps_rule_schema.md 2024-05-25
3 / 3
{
"rule_id": "002",  ← 464
"description": "Block messages from unauthorized CAN IDs to
prevent
unauthorized control commands.",
"action": "block",
"conditions": {
"can_id": ["0x999", "0xAAA", "0xBBB"]
}
},
{
"rule_id": "003",  ← 466
"description": "Monitor for high-frequency messages that may
indicate
a DoS attack.",
"action": "alert",
"conditions": {
"can_id": ["0x123"],
"message_frequency": "above_normal" // This assumes the system
can
define what 'above_normal' frequency is.
}
},
{
"rule_id": "004",  ← 468
"description": "Validate integrity of critical sensor data from
CAN
messages.",
"action": "validate",
"conditions": {
"can_id": ["0x321"],
"data_pattern": "unexpected_change" // This assumes a baseline
or
pattern exists for normal data. } } ]
```

FIG. 8

Generated System Rule Schema

```
{
"rule_id": "001",
"description": "Access control rule for application data",
"resource": "/path/to/application-data",
"action": "read",
"conditions": {
"user_role": "admin",
},
"effect": "allow"
}
```

—700

Generated Network IPS Rule Schema

```
{
"rule_id": 100001,
"description": "Detect possible ddos attack",
"protocol": "tcp",
"source": "any",
"source_port": "any",
"destination": "any",
"destination_port": "any",
"message": "Possible flooding ddos attack detected",
"conditions": {
"packet_size": ">100000"
},
"threshold": {
"type": "threshold",
"track": "by_dst",
"count": 100,
"seconds": 60
},
"sid": 100001,
"rev": 1
"action": alarm
}
```

Generated CAN Rule Schema

```
{
"rule_id": "001",
"description": "Allow only known CAN ID messages",
"action": "allow",
"conditions": {
"can_id": ["0x123", "0x456", "0x789"]
}
}
```

—720

Example Rule Output from Trained LLM

```
rule CANBus_Anomaly_Detection {
   meta:
        description = "Detects patterns indicative of anomalies or mali
        author = "Security Analyst"
        reference = "TARA report ID XYZ123"
        date = "2024-01-26"

strings:
        // Pattern representing an unusual frequency of specific CANBus
        $anomaly1 = {01 23 45 67 89 AB CD EF) nocase // Pattern indicating a known malicious payload in a CANBus fra
        $anomaly2 = "MaliciousPayloadSignature" nocase // Hex pattern that might be related to an attempt to flood the
        $anomaly3 = {DE AD BE EF) nocase condition:
        any of them
}
```

GENERATION OF TARA-BASED IDPS RULES UTILIZING GENERATIVE ARTIFICIAL INTELLIGENCE

FIELD OF THE INVENTION

The present invention relates generally to generating rules to detect malware for an intrusion detection prevention system (IDPS). More specifically, the present invention relates to generating these rules based upon a threat assessment and remediation analysis (TARA) using generative artificial intelligence.

BACKGROUND OF THE INVENTION

A connected vehicle can communicate with devices or systems that are external to the vehicle. Most new vehicles on the market today are connected in that they have components that can perform external communication by wireless or wired connection. A connected vehicle may also have sensors for receiving sensed data of its physical environment.

Connected vehicles typically have a plurality of electronic control units (ECUs) that perform various functions. For example, a connected vehicle may have an ECU for a central gateway, an ECU for in-vehicle information and entertainment, an ECU for engine management, etc. ECUs are computers with software and hardware components. More particularly, an ECU has a processor that executes software components, such as an operating system, application programs, and firmware.

Cybersecurity, within the context of connected vehicles, is the protection of automotive electronic systems, communication networks, control algorithms, software, users, and underlying data from malicious attacks, damage, unauthorized access, or manipulation. Connected vehicles are susceptible to cyberattacks, which include unauthorized intrusion, malware infection, etc. Unfortunately, traditional information technology (IT) cybersecurity measures are not readily adaptable to connected vehicles because of the complexity of these connected vehicles and the rapid evolution of malware. Furthermore, connected vehicles have different attack surfaces than general IT environments.

In particular, one important security measure required by the well-known UNECE R155 regulation is the use of an intrusion detection and prevention system (IDPS) in a connected vehicle. Automotive manufacturers are obligated to use such a system to protect vehicles such as electric vehicles. Deploying an IDPS on an electric vehicle, however, introduces many challenges for the original equipment manufacturer (OEM) and its vendors, including: comprehensive testing and validation of all of the ECUs, ensuring that the IDPS overhead does not affect overall system performance of the vehicle, not to mention the expertise needed to develop specific IDPS rules.

Generally, there are two approaches to developing IDPS rules that have been used in the prior art. The traditional human-based approach has been to use an expert to analyze all possible threat scenarios of a vehicle and then come up with the appropriate IDPS rules. But, it is difficult for an expert or experts to develop rules to cover all possible threat scenarios and such development can be very time consuming. More recently, artificial intelligence has been used to generate IDPS rules. Even though generation of these rules can be performed quickly, these AI-generated rules may not be as accurate as the human-generated rules, leading to a high false-positive rate and alert fatigue. Thus, the industry is faced with either using the traditional human-based approach (requiring greater effort and time) or the AI-based approach with its false positives.

Therefore, a new system and techniques are desirable to generate IDPS rules for connected vehicles quickly and without a high false-positive rate.

SUMMARY OF THE INVENTION

To achieve the foregoing, and in accordance with the purpose of the present invention, an approach to using generative artificial intelligence is disclosed that generates accurate IDPS rules based upon a TARA configuration.

Advantageously, the approach generates IDPS rules that fit an OEM's EEA specification, that are lightweight, that reflect requirements of the TARA analysis, and that minimize overhead that would affect the vehicle's system performance. The invention applies to all vehicles, including electric vehicles.

In a first embodiment, a large language model is trained by inputting a TARA configuration for an existing ECU of the vehicle along with an EEA specification of the vehicle. The LLM may be fine tuned by inputting a later version of the existing ECU or configurations of other ECUs in the vehicle. The LLM generates IDPS rules for another ECU of the vehicle which has no rules or few rules.

In a second embodiment a large language model is trained by inputting a TARA configuration for an existing ECU of the vehicle, an EEA specification of the vehicle and IDPS rules for the existing ECU. The LLM may be fine tuned by inputting a later version of the existing ECU or configurations of other ECUs in the vehicle. The LLM generates IDPS rules for another ECU of the vehicle which has no rules or few rules by inputting the TARA configuration of the other ECU.

In a third embodiment, a large language model is trained by inputting a TARA configuration for an existing ECU of the vehicle along with an EEA specification of the vehicle. The LLM may be fine tuned by inputting a later version of the existing ECU or configurations of other ECUs in the vehicle. The LLM generates IDPS rules for two other ECUs of the vehicle (which have no rules or few rules) by inputting the TARA configurations for the two other ECUs and prompting the LLM to generate rules for the two new ECUs.

These and other features of the present disclosure will be readily apparent to persons of ordinary skill in the art upon reading the entirety of this disclosure, which includes the accompanying drawings and claims.

BRIEF DESCRIPTION OF THE DRAWINGS

The invention, together with further advantages thereof, may best be understood by reference to the following description taken in conjunction with the accompanying drawings in which:

FIG. 4B is an example of a document in a particular format listing a TARA configuration for a specific threat scenario.

FIG. 5A shows a portion of an EEA specification for a particular ECU that may be input into the system.

FIG. 5B shows a portion of an EEA specification for a particular ECU that may be input into the system.

FIG. 6 is an example of a system rule schema such as may be found within an IDPS engine of an ECU and which may be input into the system for training.

FIG. 7 is an example of a network IPS rule schema such as may be found within an IDPS engine of an ECU and which may be input into the system for training.

FIG. 8 is an example of a CAN rule schema such as may be found within an IDPS engine of an ECU and which may be input into the system for training.

FIG. 14 is an example of a generated network IPS rule schema.

FIG. 16 is an example of another rule that may be generated and output from the LLM.

DETAILED DESCRIPTION OF THE INVENTION

As mentioned above, artificial intelligence has been used in the past to generate IDPS rules. In general, a large language model (LLM), also known as generative artificial intelligence (generative AI) can generate novel content or can rewrite or summarize information in a specific style or from a specific point of view. One of the biggest issues, however, with generative AI is the creation of "phantoms" or "hallucinations," meaning that the LLM generates incorrect information unrelated to the facts input. The present inventors recognize that as LLMs can be trained on diverse data encompassing multiple instances within the target domain, it is possible to train an LLM in the target domain using input specific to connected vehicles. In particular, it is recognized that the following may be used for training: the output from a threat assessment and remediation analysis (TARA) process, known as a TARA configuration; an electronic/electrical architecture (EEA) specification for vehicle; and existing IDPS rules. By training an LLM in this manner, the LLM is then better suited to generate more accurate (i.e., fewer false positives) IDPS rules when prompted with a specific TARA configuration, EEA specification and IDPS rules for a specific class of vehicles and is able to generate IDPS rules for a specific ECU.

Overview of a Connected Vehicle

Figure 17:
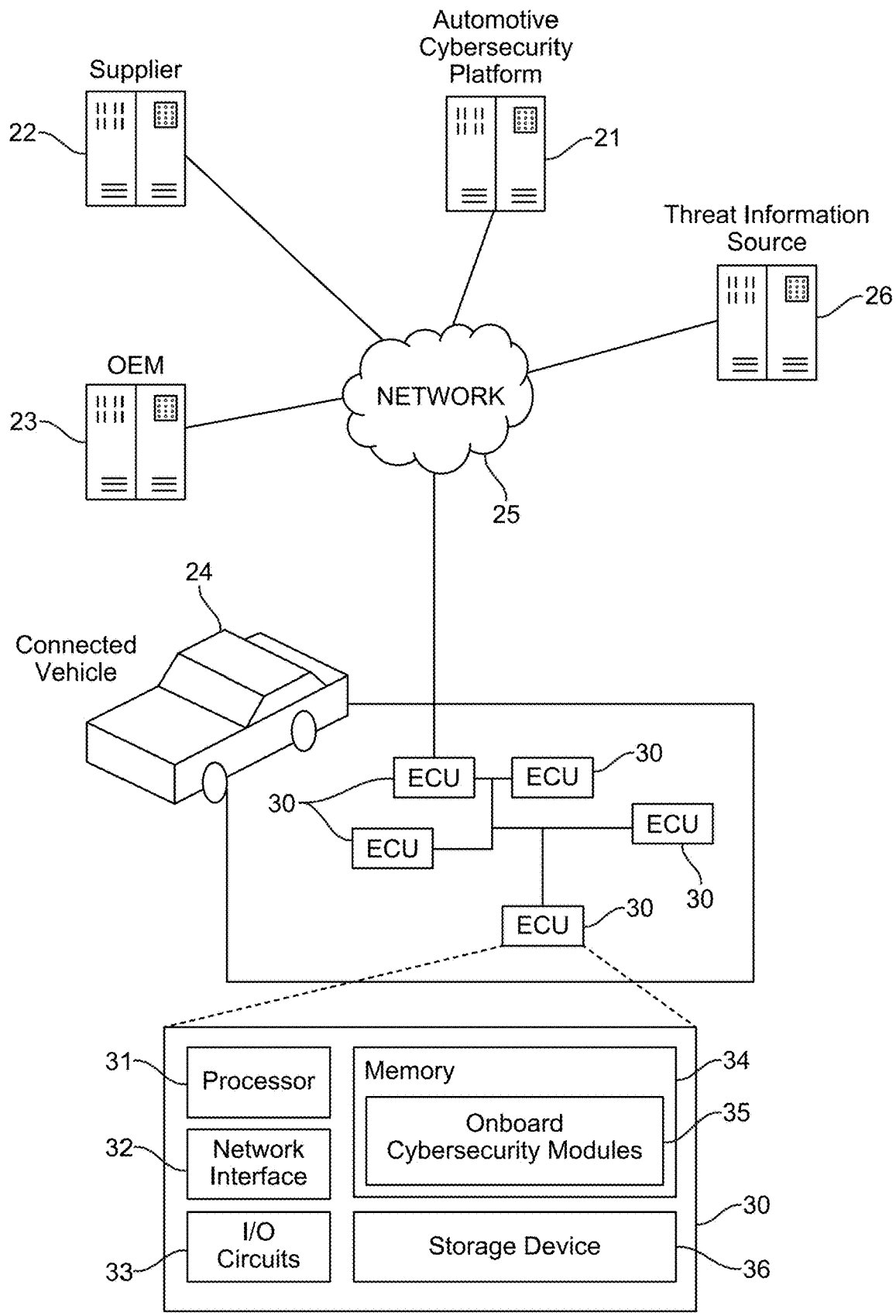
FIG. 17 is a block diagram of a connected vehicle in accordance with an embodiment of the present invention.

FIG. 17 shows a block diagram of a connected vehicle 24 in accordance with an embodiment of the present invention. FIG. 16 shows a single connected vehicle 24, a single third-party supplier 22, and a single OEM 23 for illustration purposes only. As can be appreciated, there are many OEMs that manufacture connected vehicles that have components sourced from many different third-party suppliers.

The connected vehicle 24 has a plurality of ECUs 30. An ECU 30 may be for engine management or onboard diagnostics (e.g., OBD II), may help implement a safety system, a body system, a chassis system, a power system, remote keyless entry, vehicle-to-everything (V2X) interfaces etc., and may also be referred to as a telematics control unit (TCU), an in-vehicle information and entertainment ("infotainment") (IVI) system, a central gateway, or a Global Navigation Satellite System (GNSS). One or more of the ECUs 30 and associated software components may be provided by the supplier 22 to the OEM 23, which is the manufacturer of the connected vehicle 24. The supplier 22 may provide firmware, source code, or other software components by removable storage media (e.g., Universal Serial Bus, flash storage) or over a communication network 25, which includes the Internet in this example. Each of the OEM 23 and the supplier 22 is depicted as a computer system to indicate that the OEM 23 and the supplier 22 may send and receive software components and communicate with the connected vehicle 24 over the network 25.

An ECU 30 is a computer comprising at least one processor 31, a memory 34, one or more network interfaces 32 for connecting to an internal or external communication network, and one or more input/output (I/O) circuits 33. An I/O circuit 33 may be a data acquisition and control circuit, a sensor interface, or other circuit for receiving data from external sources, such as data from other connected vehicles, sensed data of the environment outside the connected vehicle 24, etc. The memory 34 may be non-volatile memory (e.g., non-volatile random access memory "NVRAM") or volatile memory (e.g., dynamic random access memory "DRAM"). Instructions of one or more onboard cybersecurity modules 35 and other software components of the ECU 30 may be stored in the memory 34 for execution by the processor 31. A storage device 36 may be a mass storage device, such as solid-state drive (SSD). A particular ECU 30 may have fewer or greater components depending on the function of the ECU 30.

An ECU 30 may be connected to other ECUs 30 over an internal (i.e., in-vehicle) communication network, such an Ethernet network or a Controller Area Network (CAN) onboard the connected vehicle 24. An ECU 30 may communicate with external devices outside of the connected vehicle 24 by way of a V2X network, vehicle ad-hoc network (VANET), Wi-Fi, or other external communication network.

An automotive cyber security platform 21 may comprise a computer system with associated software for supporting cyber security procedures in one or more connected vehicles. The cyber security platform 21 may comprise at least one processor and a memory, with the memory storing instructions that when executed by the processor causes the cyber security platform to perform as described herein. The cyber security platform 21, which is external to the connected vehicle 24, may be implemented on a cloud computing platform (e.g., Amazon Web Services "AWS") or other computer system. The cyber security platform 21 may serve as a vehicle security operations center for the connected vehicle 24. The cyber security platform 21 may perform on-the-cloud, offboard (i.e., not on the connected vehicle 24) cyber security procedures for the connected vehicle 24, such as offboard anomaly event detection and offboard correlation.

In the example of FIG. 17, the cyber security modules 35 may be generated at the cyber security platform 21 and provided to the connected vehicle 24 at the factory by the OEM 23, over the communication network 25, or by removable storage media (e.g., USB flash storage). The cyber security modules 35 are configured to perform cyber security procedures as described herein. The cyber security modules 35 are onboard in that they are deployed on the connected vehicle 24.

A threat information source 26 may comprise a computer system that provides common vulnerabilities and exposures (CVE) information, news of cyber threats, feedback from a bug bounty program, or other cyber threat intelligence. A vulnerability is a flaw or weakness in a software component (e.g., firmware, application program) or other component of an ECU. A vulnerability may be addressed directly with a patch that fixes the vulnerable component itself or indirectly with a virtual patch. Unlike a patch, a virtual patch does not fix the vulnerable component itself. Instead, the virtual patch monitors for and blocks an exploit from taking advantage of the vulnerability.

Figure 2:
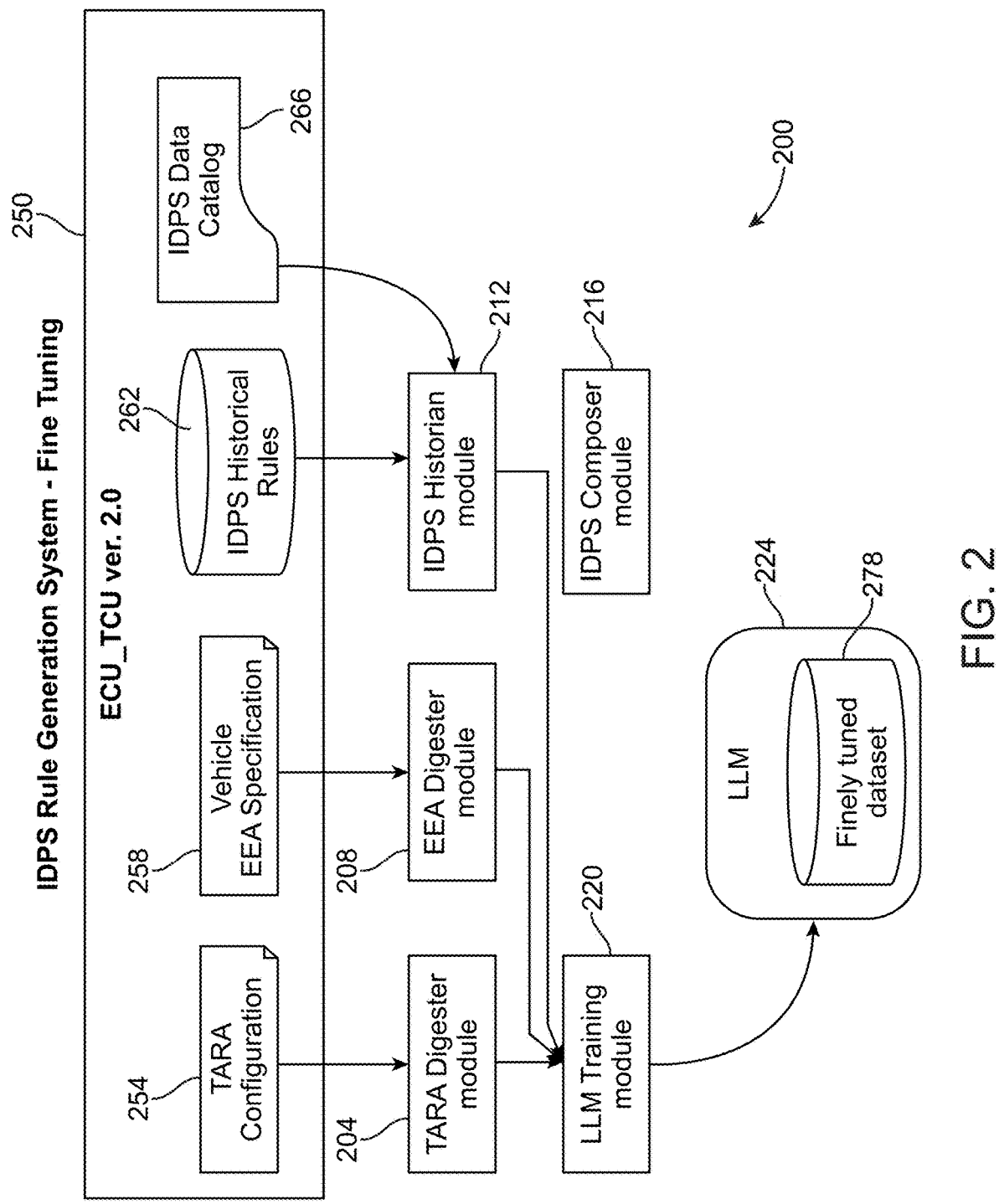
FIG. 2 is a block diagram of a fine-tuning generation system (and its inputs) according to another embodiment.
Figure 18:
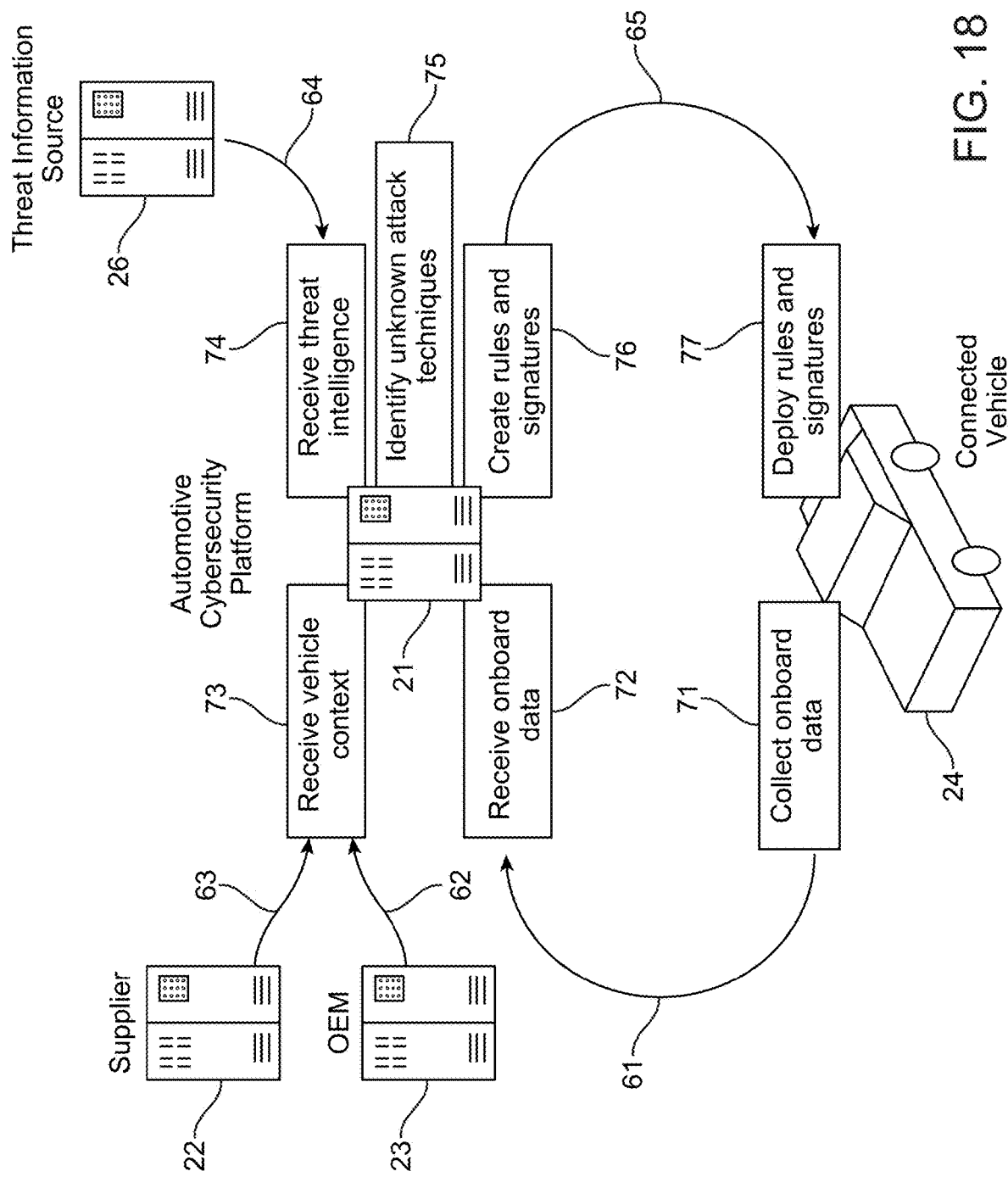
FIG. 18 is a flow diagram of protecting the connected vehicle from cyber attacks in accordance with an embodiment of the present invention.

FIG. 18 shows a flow diagram of protecting the connected vehicle 24 from cyber attacks, in accordance with an embodiment of the present invention. In the example of FIG. 2, one or more onboard cyber security modules collect onboard data (step 71) of the connected vehicle 24 and transmit the onboard data to the cyber security platform 21 (see arrow 61). Onboard data are data detected in the connected vehicle 24, including network traffic on internal communication networks, CAN messages, sensor data, vehicle signals, data in ECUs, etc. The onboard data are received in the cyber security platform 21 (step 72). Typically, this onboard data is in the form of detection logs collected in the ECUs, and in other cyber security modules such as in-vehicle anomaly detectors, a network intrusion detector or a rule-based IDPS detector.

The cyber security platform 21 further receives vehicle context (step 73) from the OEM 173 (see arrow 62) and the supplier 22 (see arrow 63). Vehicle context includes information on the design and components of the connected vehicle 24, including a software bill of materials (SBOM) of software components, ECU versions and makes, etc. The cybersecurity platform further receives threat intelligence (step 74) from the threat information source 176 (see arrow 64).

In the cyber security platform 21, onboard data from the connected vehicle 24, vehicle context, and threat intelligence are analyzed to identify one or more unknown attack techniques (step 75). As its name indicates, an unknown attack technique is previously unknown to cyber security researchers. Cyber security researchers may create a rule for preventing the (now known) attack technique and/or an attack signature for detecting the attack technique (step 76). For example, cyber security researchers may analyze the onboard data, vehicle context, and threat intelligence to identify attack techniques, identify features and patterns of the attack techniques, and create corresponding rules and attack signatures. Rules and attack signatures generated in the cyber security platform 21 are provided to the connected vehicle 24 (see arrow 65). In the connected vehicle 24, the rules and attack signatures are deployed (step 77) by incorporating them in corresponding onboard rule-based and signature-based modules. Connected vehicle 24 is protected by a distributed cyber security framework in that cyber security procedures are distributed between the connected vehicle 24 and the cyber security platform 21.

Overview of System Training and Fine Tuning

As mentioned above, a novel system is able to generate relevant IDPS rules for a particular ECU; this generation system includes a training phase and a fine-tuning phase as described in more detail below.

Figure 1:
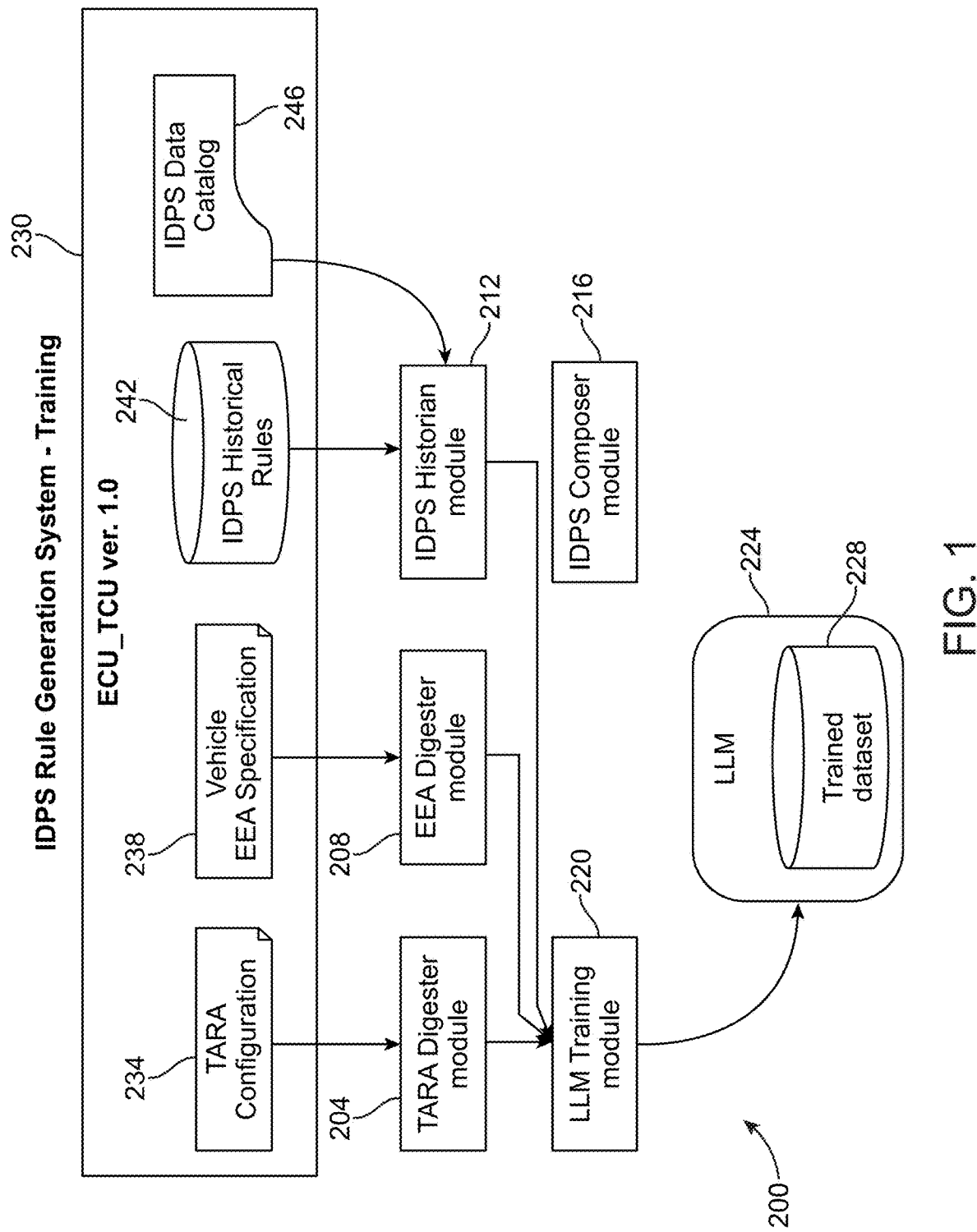
FIG. 1 is a block diagram of a training generation system (and its inputs) according to one embodiment.

FIG. 1 is a block diagram of a training generation system 200 (and its inputs) according to one embodiment. System 200 includes a TARA digester module 204, an EEA digester module 208, an IDPS historian module 212, an LLM training module 220, an IDPS composer module 216, and an LLM 224 having a trained dataset 228. Also shown are inputs to system 200 for training and fine-tuning purposes. In FIG. 1 we show training input from a TCU ECU version 1 230; inputs from other ECUs and other versions may be used as described in more detail below. System 200 may execute upon automotive security platform 21 or upon any other suitable computer.

TARA configuration 234 is the output from a TARA process for this particular ECU; such configurations are known in the art and examples are shown below. A typical TARA configuration for an ECU describes that item including related assets, interfaces, a security perspective, possible attack scenarios and may include text files or diagrams. As known in the art, Vehicle EEA specification 238 is the EEA specification for a particular vehicle or model and examples are given below and may include formats such as ARXML, AUTOSAR XML, etc. IDPS historical rules 242 are existing rules for ECU 230 (of which there may be none).

IDPS data catalog 246 includes the categories monitored by the IDPS engine of the ECU including IDPS categories such as host IDPS, Ethernet IDPS, CAN bus IDPS, etc. Host IDPS refers to monitoring system attributes, e.g. application white listing, CPU resource limitations, memory limitations, critical resource access, etc. Ethernet IDPS refers to monitoring the network traffic of an Ethernet application, e.g. an FTP server, push messages, device management, etc. CAN bus IDPS refers to monitoring network traffic of a CAN bus application, e.g. vehicle status queries, vehicle controller configuration, CAN ECU communications, etc. Of course, different categories have different elements inside its data field. E.g. if the IDPS category is "Ethernet IDPS" the data field will contain: Action (Alert/Drop/Pass/Log), Protocol, Network direction, Source IP, Source Port, Destination IP, Destination Port, Rule Options (e.g. trigger every time if hit/once every 1 minute/etc.)

Returning now to the description of system 200, digester 204 is a software module that inputs the TARA configuration and extracts a cyber security feature vector which is then output to the LLM training module 220. EEA digester 208 is also a software module that inputs the vehicle EEA specification and extracts a cyber security feature vector which is then output also to the LLM training module 220. The types of features that are extracted depend upon the TARA configuration or the EEA specification. From a TARA configuration we may extract: "Hardware Secure Element for Key Storage," "WiFi password use WPA2 Personal," "Network Filter function and IDPS function need to be set to Serial Mode," etc. From an EEA specification we may extract: "the ECU has two ethernet connections to IVI and Gateway," "VLAN configured on the Ethernet between ECU and IVI," VLAN configured on the Ethernet between ECU and Gateway," "High speed CANbus interface on ECU," "Passive Entry Passive Start is the critical service executed on CANbus," "Body Control Module is connected to CANbus," etc. The TARA configuration and the EEA can be input into the digesters in various formats (including those shown below), e.g. XML, JSON, YAML, etc., but the training module will still input feature vectors into the LLM 224.

IDPS historian module 212 is also a software module which inputs the historical rules 242 and categories from the catalog 246 and processes these to produce a feature vector for each which are also output to the training module 220. LLM training module 220 is a software module that trains the LLM 224 using input from 204, 208 and 212, basically using a large set of data to train the LLM from scratch. Training module 220 is a software module separate from the LLM 224. It processes its input data and outputs feature vectors to the LLM as the LLM only accepts feature vectors as input. The feature vectors provide the concepts that the LLM will learn. LLM 224 may be any suitable large language model such as Bloom-1.7b, TinyLLaMa-1.1B, MobileLLM-1.5B, Pythia, Falcon, MobiLlama, etc.

Trained dataset 228 is a vector database forming part of the LLM and is not human readable. Techniques for training an LLM using input data are known in the art and are not described in detail herein. As shown, for a first training iteration we use ECU TCU version 1.0 in order to train the LLM. Other ECUs and other versions may be used to train the LLM 224 to give a broader understanding of the relationship between different TARA configurations, the EEA and the corresponding IDPS rules.

FIG. 2 is a block diagram of a fine-tuning generation system 200 (and its inputs) according to another embodiment. System 200 shows how the trained dataset 228 of FIG. 1 may be fine tuned to become a finely-tuned dataset 278. After the initial training (using any number of ECUs and versions), we use data from version 2.0 250 of the same ECU TCU as in FIG. 1 in order to finely tune dataset 278. As mentioned, the LLM fine-tuner and training module 220 bases its fine tuning on the training previously performed in order to understand the new data from 204, 208 and 212, and tweaks the weight of the LLM's hidden layer. The LLM fine-tuner is a module separate from LLM 224; it calls 204, 208, 212 in order to collect the feature vectors from each, and then iteratively feeds this data into LLM 224, evaluating the result of this learning at the end of each iteration, which includes feeding new training data into LLM 224 and receiving its output.

Accordingly, TARA configuration 254, IDPS rules 262 and data catalog 266 pertaining to version 2.0 are used to perform the fine tuning, again using training module 220. Essentially, training and fine tuning may use the same procedure and the same training module 220, except that during fine tuning (after the LLM has been trained with a large dataset), we input a small set of related data to fine tune the weight of various nodes in the middle layer of the LLM. The vehicle EEA specification 258 is the same as in version 1.0 because it is for the vehicle and not specific to the TCU version; typically, the EEA will be the same.

Figure 3:
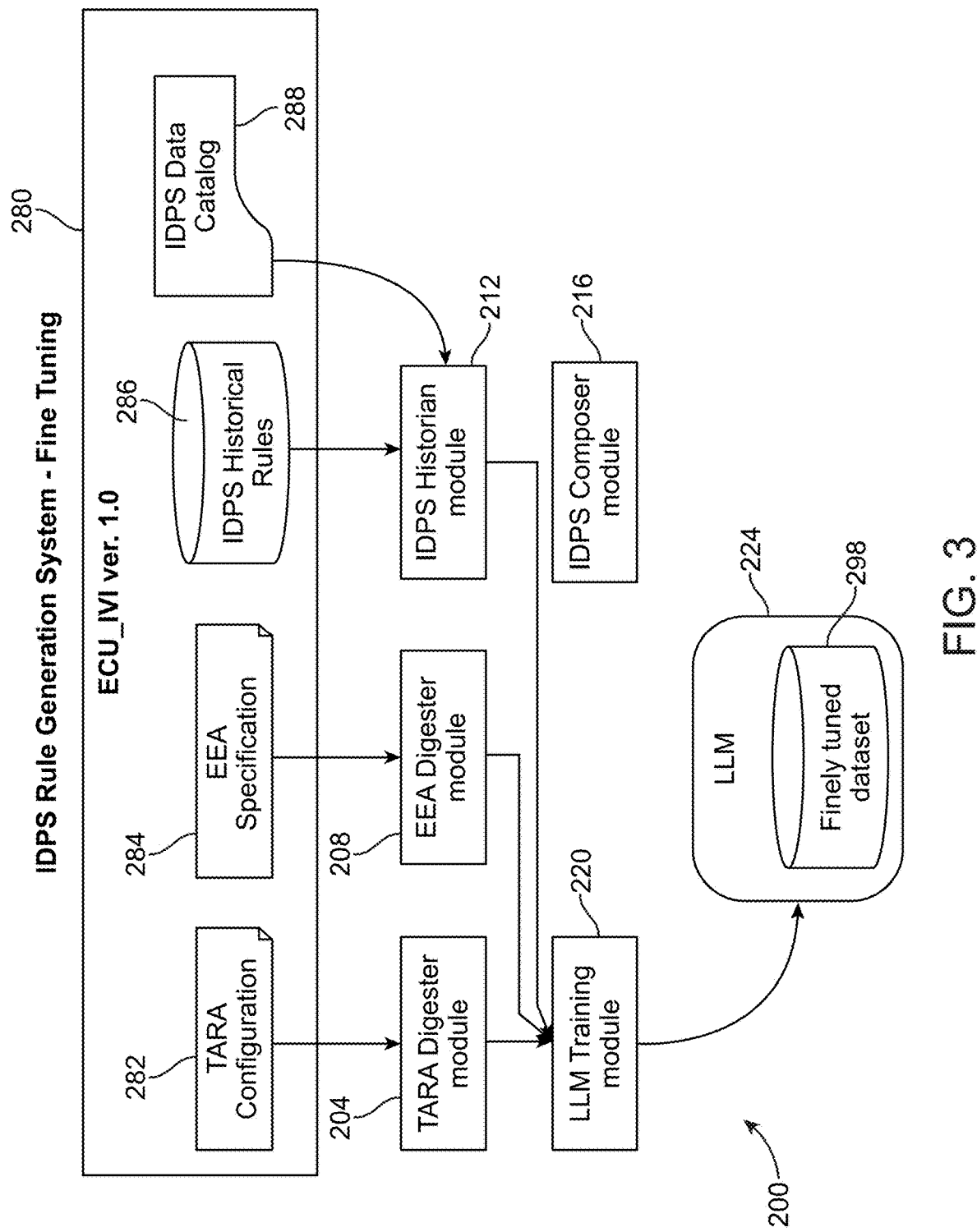
FIG. 3 is a block diagram of a fine-tuning generation system (and its inputs) according to another embodiment

FIG. 3 is a block diagram of a fine-tuning generation system 200 (and its inputs) according to another embodiment. System 200 shows how the trained dataset 278 of FIG. 2 may be further fine tuned to become a more finely-tuned dataset 298. In this figure, in order to give LLM 224 a broader understanding, we use data from a different ECU, namely ECU IVI 280 version 1.0. Accordingly, TARA configuration 282, IDPS rules 286 and data catalog 288 pertaining to this additional ECU are used to perform further fine tuning, again using training module 220. The result is a more finely tuned dataset 298. Of course, further fine tuning may be performed with different ECUs and different versions. For example, data from an ECU IVI version 2.0 may also be used to perform fine tuning. At this point, LLM 224 has been trained and finely tuned and is ready to generate IDPS rules for a new ECU.

Example Inputs for Generation System

Above we describe the generation system 200 and below we provide examples of the types of input that may be provided to train and fine tune this system.

Figure 4A:
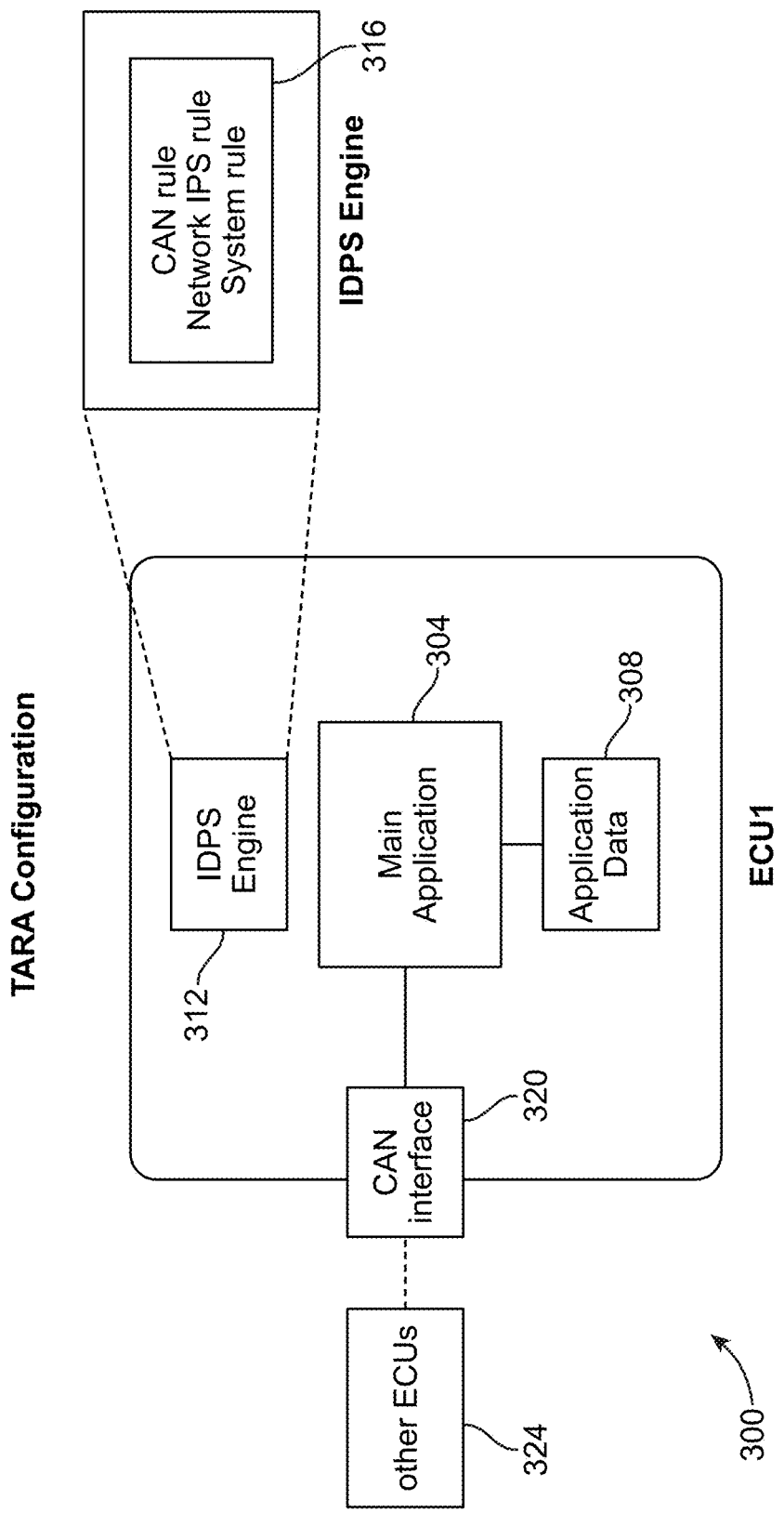
FIG. 4A is an example of a diagram from a TARA configuration that may be output from a TARA process and input into the system.

FIG. 4A is an example of a diagram 300 from a TARA configuration that may be output from a TARA process and input into system 200. Shown is a diagram for a particular ECU having a main software application 304, its application data 308, an IDPS software engine 312 including various rules 316 (e.g. CAN rules, network IPS rules, and system rules), and a CAN interface 320 that interfaces with any number of other ECUs 324. Instead of interface 320 diagram 300 may instead may have a network interface. The TARA report for a TARA configuration may also include a document that lists asset identification and impact rating (e.g., application data), threat scenarios and attack path analysis, mitigation strategies, etc.

FIG. 4B is an example of a document 350 in a particular format listing a TARA configuration for a specific threat scenario. Shown is an identifier 352 for a particular threat scenario, a description 354 of the threat scenario, an identifier 356 for a particular attack path, a description 358 of the attack path, an identifier 364 of the attack path, an attack feasibility level 362, an aggregated attack feasibility level 364, a risk value 366, a risk treatment option 368 and a risk treatment description 370. Of course, many other threat scenarios may be described in such a document and the document may take many other forms.

FIG. 5A shows a portion 400 of an EEA specification for a particular ECU that may be input into system 200. Shown are details for a particular ECU 402 including its IDPS features, components 404, and connections 406.

FIG. 5B shows a portion 410 of an EEA specification for a particular ECU that may be input into system 200. Shown are details for a particular ECU 412 including its IDPS features, components 414, connections 416, and networks 418.

FIG. 6 is an example of a system rule schema such as may be found within an IDPS engine of an ECU and which may be input into system 200 for training. Shown are rules 430-438. FIG. 7 is an example of a network IPS rule schema such as may be found within an IDPS engine of an ECU and which may be input into system 200 for training. Shown is a rule 450. FIG. 8 is an example of a CAN rule schema such as may be found within an IDPS engine of an ECU and which may be input into system 200 for training. Shown are rules 462-468.

Generation of IDPS Rules

Figure 9:
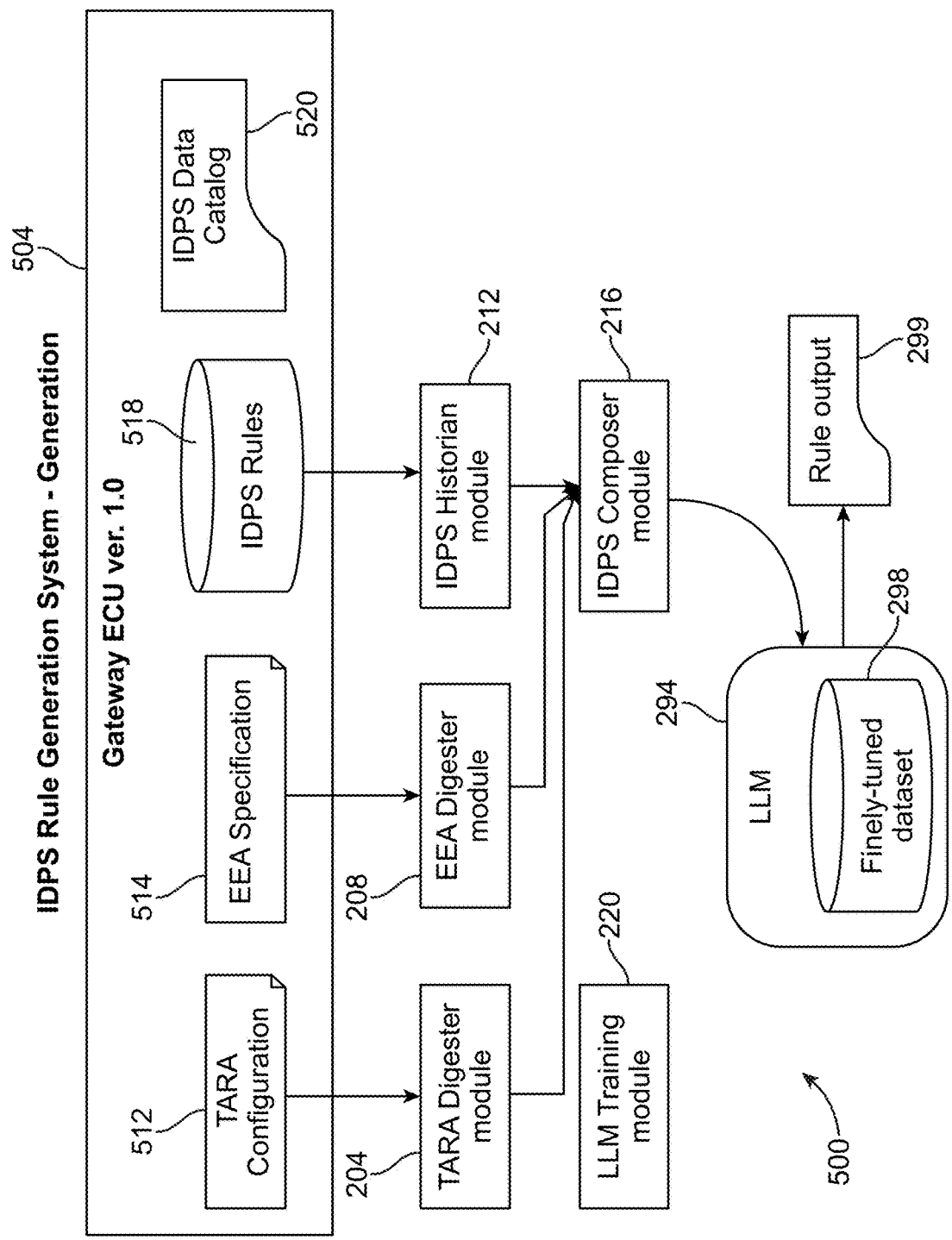
FIG. 9 shows a generation system ready to generate IDPS rules for a particular ECU.

FIG. 9 shows a generation system 500 ready to generate IDPS rules for a particular ECU. System 200 and has been fully trained and finely tuned and may now generate IDPS rules for a new Gateway ECU version 1.0 that currently has no IDPS rules. System 500 includes digester module 204, digester module 208 and IDPS historian module 212 which now output their respective data into IDPS composer module 216. Training module 220 is not used. Gateway ECU 504 is typically a new ECU for which there are no IDPS rules, although it may have some customer-defined rules already. Input into system 500 are a TARA configuration 212 for ECU 504, a vehicle EEA specification 514 corresponding to ECU 504, IDPS historical rules (if any) 518 and IDPS Data Catalog 520. IDPS composer module 216 will accept these inputs and will then input them into LLM 294 in order to generate IDPS rules for ECU 504. Rule output 299 includes the generated rules which may be transmitted and stored in the IDPS engine of ECU 504 of vehicle 24 or sent to another computer or vehicle. As shown, rules may be output 299 directly from LLM 294 or may be output to composer 216 for an iterative evaluation as described below.

Typically, the vehicle EEA specification 514 may be input again, even though it may be the same EEA specification that was input during training. The EEA specification is input again as the system may be asked to generate IDPS rules for different EEA specifications, using the same ECU used in training or a different ECU new to the system. The training process allows the LLM to understand every item in an EEA specification and what the relationship is between EEA items to other attributes in a TARA configuration, in IDPS rules, etc. After the LLM has learned those concepts in training, it can generalize to other ECUs.

The IDPS composer module 216 is separate from LLM 294. In order to process its input data, the IDPS composer calls 204, 208, 212 in order to collect the respective feature vectors, feeds that data into LLM 294 with an appropriate LLM prompt, and then may evaluate the generated output. In this embodiment, rules 299 are output back to composer 216 for evaluation in an iterative process. Accordingly, the evaluation process feeds data iteratively and compares the similarities of each run after each iterative input. If the output remains stable, then that becomes the final output. Because every LLM has an input token length limitation, IDPS composer 216 may need to send a prompt and feature vectors several times to finish the complete input.

Figure 10:
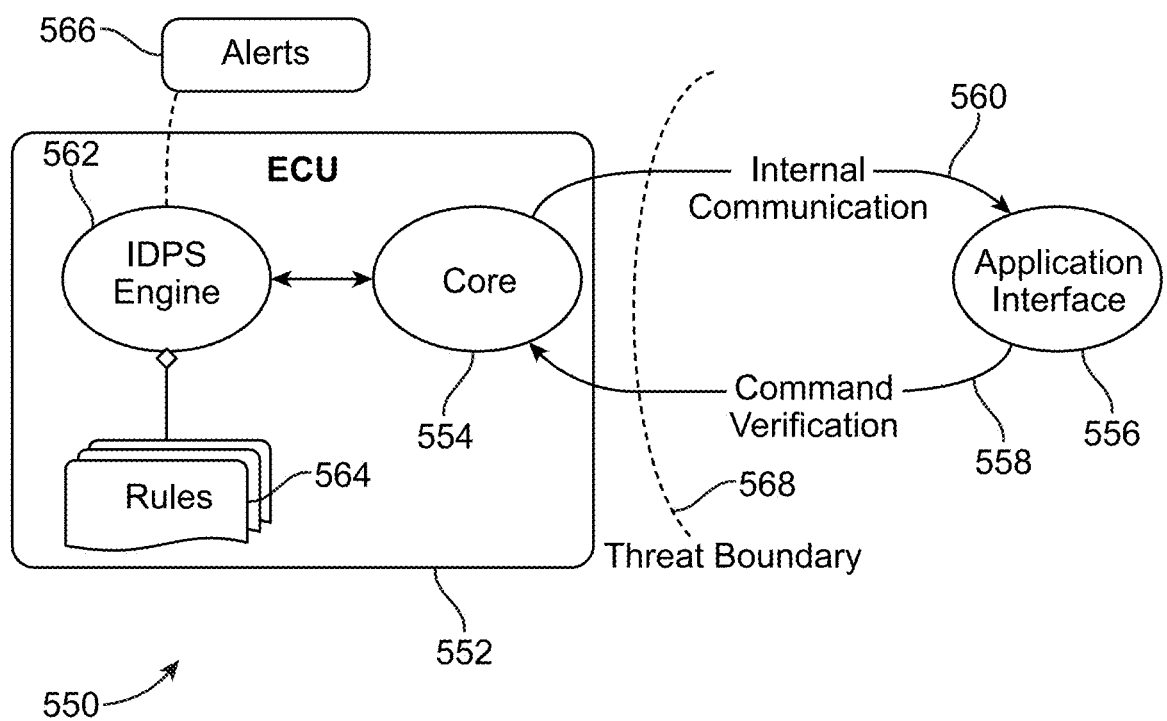
FIG. 10 is a block diagram of example IDPS rules generated for a particular ECU.

FIG. 10 is a block diagram of example IDPS rules generated for a particular ECU. Shown is TARA configuration diagram showing an ECU 552, its core processor 554 in communication with an application interface 556 via paths 558 and 560. The ECU has an IDPS engine 562, rules 564 and may generate external alerts 566. In this example, IDPS rule generation system 500 may generate rules for the internal communication between core 554 and interface 556. The configuration diagram shows a threat boundary 568 defining the two interfaces that could pose a cyber security threat. Advantageously, system 500 is able to generate rules to protect the internal communication path 560 (such as packet encryption) and the command verification path 558.

Figure 11:
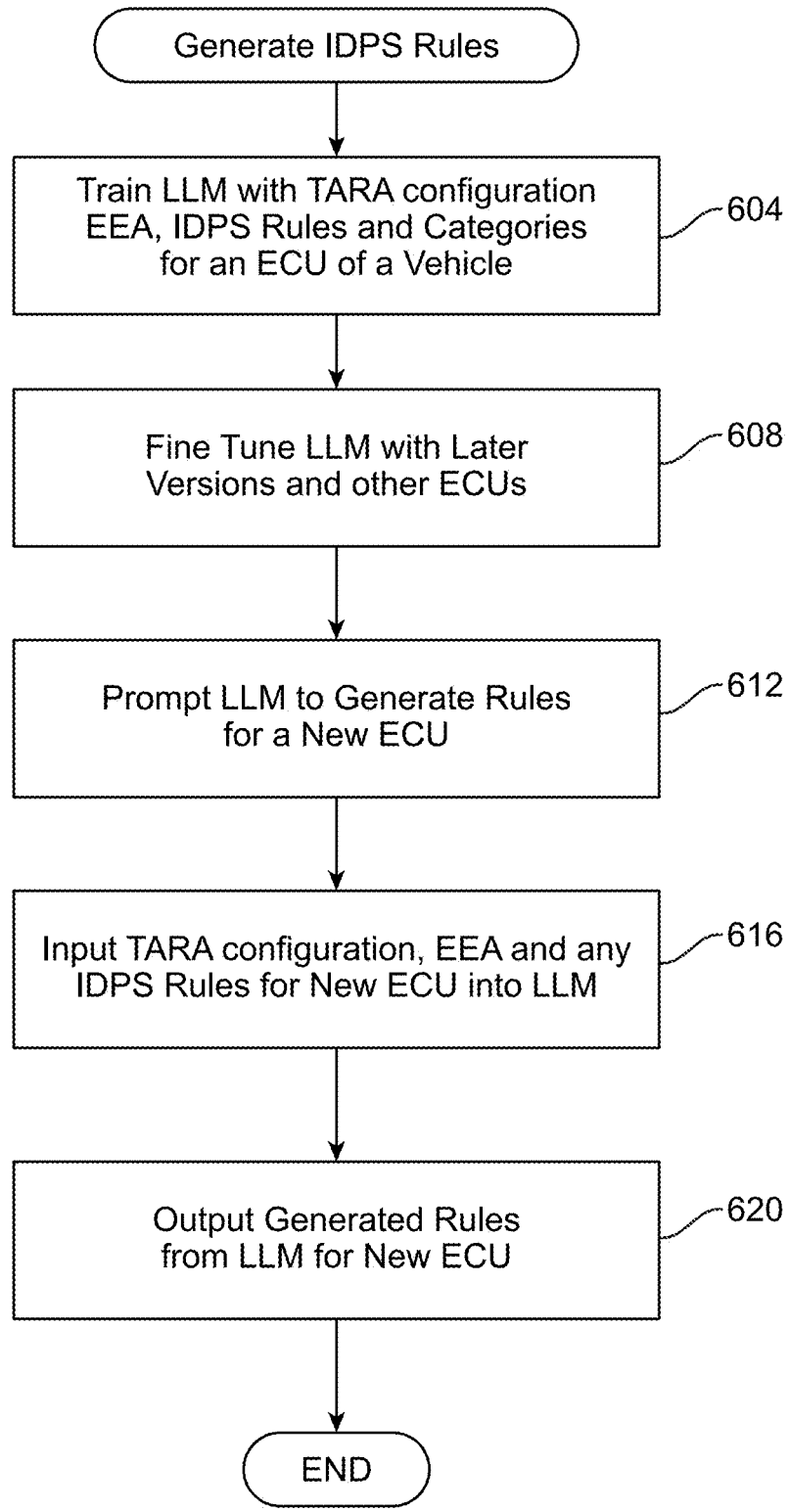
FIG. 11 is a flow chart describing one embodiment for generating IDPS rules using the system.

FIG. 11 is a flow chart describing one embodiment for generating IDPS rules using system 500. As mentioned earlier, there is first a training phase, a fine-tuning phase, and then a generation phase which outputs the new IDPS rules for a particular ECU. In step 604 the LLM is trained with a large dataset such as the TARA configuration for a particular ECU, the EEA specification for the corresponding vehicle, the existing IDPS rules for that ECU, and the categories of protection from a data catalog for the ECU of the vehicle. Training may be conducted as previously shown and described in FIG. 1 and in FIGS. 4A-8. Preferably, feature vectors from the TARA configuration and EEA specification are input into the LLM and historical IDPS rules and categories and data in the form of feature vectors are also input into the LLM via training module 220. Preferably, fine-tuning and training of the LLM does not use a prompt. Module 220 calls the LLM's API then feeds the data in for fine-tuning or for training. Any suitable large quantity of training data may be used to establish a foundational model in the LLM.

Figure 12:
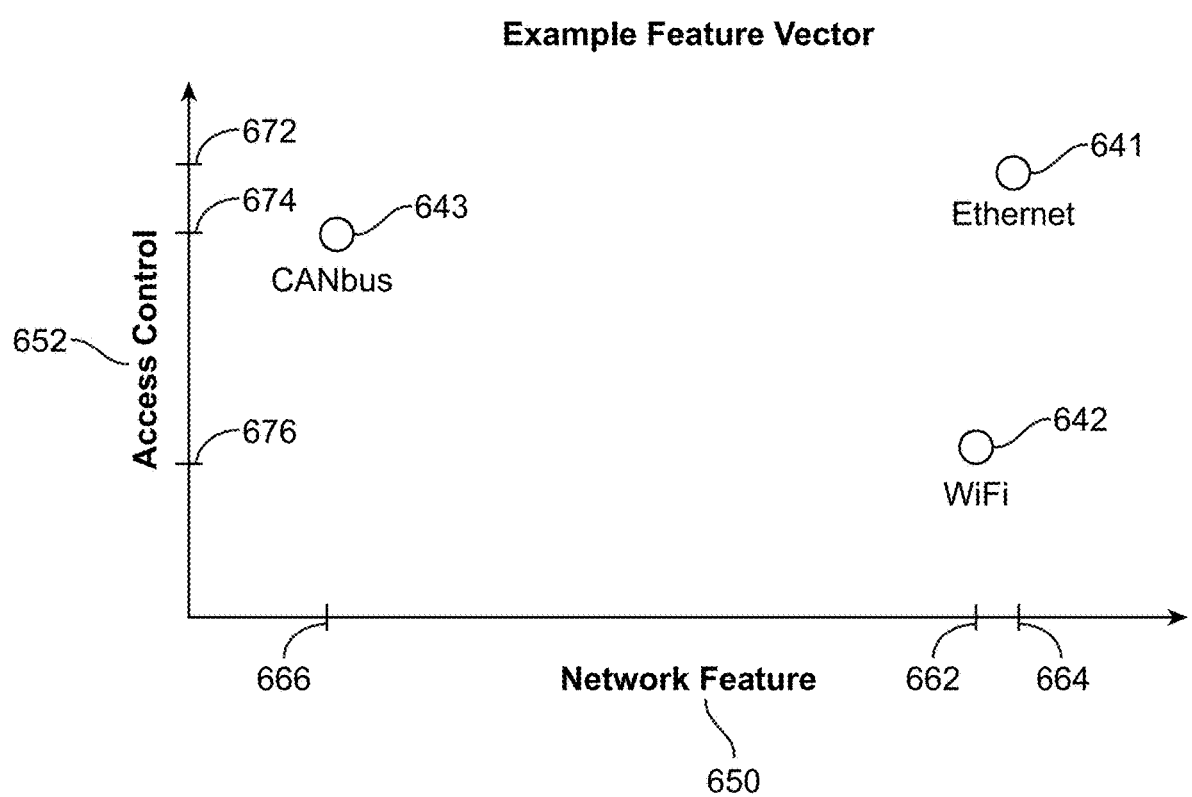
FIG. 12 is an example feature vector.

FIG. 12 is a graph showing an example of a simple feature vector. The figure shows a feature vector after inputting and processing a simple TARA configuration into the digester. We only show two dimensions (x and y axis) for a better understanding; many more dimensions are typically used. The x-axis 650 is the dimension of Network Features in an LLM knowledge network, y-axis 652 is the dimension of Access Control in an LLM knowledge network. The distance between two dots shows the similarity of features in a particular dimension. By way of example, on the Network Feature dimension 650, the LLM will learn that the features of Ethernet 641 and WiFi 642 (both identified by an IP address, and both transfer encrypted data payload) are more similar than Ethernet 641 and CANbus 643 (because the distance between 662 and 664 is less than between 664 and 666). But on the Access Control dimension 652, the LLM will learn that Ethernet and CANbus (both segregated by domain, both need application access control) have more in common than Ethernet and WiFi (because the distance between 672 and 674 is less than between 672 and 676).

In step 608 the LLM of the system is fine tuned using data from later versions of the ECUs already submitted and by submitting data from other ECUs of the vehicle. This step may be performed as described above and with reference to FIGS. 2, 3 and others. In one particular embodiment, the reward used by the LLM is to minimize the impact caused by irrelevant IDPS rules. The outcome of step 608 is an LLM that has learned from the highly-related data from the EEA and TARA configurations of a particular ECUs of a vehicle, along with existing IDPS rules of those ECUs. Thus, after numerous iterations of training and fine tuning, the generative LLM has learned and identified correlations between the input TARA configurations, the EEA and any IDPS rules input. Since the system is now based on an LLM foundational model after training, only a small amount of data needs to be input for fine-tuning. In general, there should be at least five examples for each data field in every ECU to fine-tune the LLM, and for the same component, there should be more than one hundred rules to describe its behavior. Fine-tuning will also call the LLM's API and then feed training data in for fine-tuning; no prompt is needed.

In step 612 the LLM is prompted to generate new IDPS rules for a new ECU such as is shown in FIG. 9. For example, the prompt may be "You are an automotive cyber security expert. Based upon the following vehicle EEA, TARA configuration for an ECU, and existing IDPS schema for this ECU, please help to generate the necessary network, system or CAN bus rules for this ECU."

Next, in step 616 (or conjunction with step 612) the TARA configuration for the new ECU, the EEA for the vehicle, and any existing IDPS rules for that new ECU are all input into the LLM. For example, TARA configuration 512, EEA specification 514 and any IDPS rules 518 for Gateway ECU version 1.0 504 from FIG. 9 are input into system 500 in order to generate the new IDPS rules. In one particular example, the operator selects the input TARA, EEA, and IDPS data if any, then clicks "generate IDPS rules." The system may use a predefined prompt, e.g. "This is an automotive ECU, we are designing cybersecurity features. Consider the attack path as [THE FEATURE VECTOR EXTRACTED FROM TARA] and the Electric Electronic Architecture as [THE FEATURE VECTOR EXTRACTED FROM EEA]; generate IDPS rules for host and network, also take [THE FEATURE VECTOR EXTRACTED FROM IDPS DATABASE] into account."

Next, in step 620 LLM 294 processes the input and outputs the following information. An answer such as "Based upon the EEA, TARA configuration and the IDPS schema, the following rules can be generated." The LLM then outputs rules such as shown in FIGS. 12, 13 and 14.

Figure 13:
FIG. 13 is an example of a generated system rule schema.

FIG. 13 is an example of a generated system rule schema. Shown is a single rule 700 which provides access control for application data.

FIG. 14 is an example of a generated network IPS rule schema. Shown is a single rule 710 which can detect a possible DDOS attack.

Figure 15:
FIG. 15 is an example of a generated CAN rule schema.

FIG. 15 is an example of a generated CAN rule schema. Shown is a single rule 720 that allows only known identification messages.

FIG. 16 is an example of another rule that may be generated and output from LLM 294. Shown is a rule 750 is used for anomaly detection on the CAN bus. The rule can detect patterns indicative of anomalies or malicious behavior. This rule is used to remediate a specific TARA security claim in a YARA schema.

A wide variety of other rules may be generated. In one example, an ECU has both a Wi-Fi and a cellular modem interface but does not have Bluetooth nor NFC. In the TARA configuration for this ECU there are threat scenarios of all communication interfaces that are identified and listed. The novel system is able to generate only those IDPS rules relevant to Wi-Fi and the cellular modem; any IDPS rules for communication interfaces not available on the ECU will not be generated or enabled. In other words, only Internet communication-related IDPS rules will be generated. Further, rules may be generated for an IDPS engine that are used for detection logging or for blocking specific data payload, etc.

In another example, there are multiple ECUs with distinct roles listed in the EEA. There is a secure Gateway ECU available to filter all input and output traffic with a layer 7 firewall. There is also a TCU ECU that works only as a cellular modem, without storing sensitive data nor accessing the vehicle control unit ECU. The LLM will generate IDPS rules that are minimized at the TCU and will generate and move more rules to the secure Gateway ECU in order to concentrate computing resources where most useful and thus minimize computing at the TCU.

A different prompt may be used to obtain this result for two ECUs. The input data for both of the ECUs is input consecutively when prompting the system to generate IDPS rules. For instance, we input TARA data for multiple ECUs one by one; the prompt may be "This is an automotive ECU, we are designing cybersecurity features. We focus on two ECUs, Gateway and TCU. Consider the attack path as [THE FEATURE VECTOR EXTRACTED FROM TARA] and the Electric Electronic Architecture as [THE FEATURE VECTOR EXTRACTED FROM EEA]; generate the IDPS rules for host and network for the TCU, also take [THE FEATURE VECTOR EXTRACTED FROM IDPS DATABASE] into account."

While specific embodiments of the present invention have been provided, it is to be understood that these embodiments are for illustration purposes and not limiting. Many additional embodiments will be apparent to persons of ordinary skill in the art reading this disclosure.

We claim:

1. A method of generating intrusion detection and prevention system (IDPS) rules for an electronic control unit (ECU) of a connected vehicle, said method comprising:
   training a large language model (LLM) by inputting into said LLM a first threat assessment and remediation analysis (TARA) configuration of a first ECU of said connected vehicle and an electronic and electrical architecture (EEA) specification of said vehicle;
   inputting a second TARA configuration of a second ECU of said connected vehicle into said LLM and prompting said LLM to generate IDPS rules for said second ECU based upon said second TARA configuration; and
   outputting at least one IDPS rule generated by said LLM appropriate for use by an IDPS engine of said second ECU.

2. A method as recited in claim 1 further comprising:
   training said LLM by extracting a feature vector from said first TARA configuration and a feature vector from said EEA specification and inputting both feature vectors into said LLM.

3. A method as recited in claim 1 further comprising:
   training said LLM by also inputting at least one IDPS rule from said first ECU into said LLM.

4. A method as recited in claim 3 further comprising:
   training said LLM by also inputting at least one category monitored by an IDPS engine of said first ECU.

5. A method as recited in claim 1 further comprising:
   storing said generated IDPS rule in said IDPS engine of said second ECU.

6. A method as recited in claim 1 wherein said prompting further includes an instruction to minimize the overhead on said second ECU.

7. A method as recited in claim 1 further comprising:
   inputting, along with said second TARA configuration, at least one IDPS rule of said second ECU.

8. A method of generating intrusion detection and prevention system (IDPS) rules for an electronic control unit (ECU) of a connected vehicle, said method comprising:
   training a large language model (LLM) by inputting into said LLM a first threat assessment and remediation analysis (TARA) configuration of a first ECU of said connected vehicle, an electronic and electrical architecture (EEA) specification of said vehicle and at least one IDPS rule from said first ECU;
   inputting a second TARA configuration of a second ECU of said connected vehicle into said LLM and prompting said LLM to generate IDPS rules for said second ECU based upon said second TARA configuration; and
   outputting at least one IDPS rule generated by said LLM appropriate for use by an IDPS engine of said second ECU.

9. A method as recited in claim 8 further comprising:
   training said LLM by extracting a feature vector from said first TARA configuration, a feature vector from said EEA specification and a feature vector from said at least one IDPS rule, and inputting all three feature vectors into said LLM.

10. A method as recited in claim 9 further comprising:
    inputting said first TARA configuration, said EEA specification and said at least one IDPS rule by using at least one software module separate from said LLM in order to extract said all three feature vectors.

11. A method as recited in claim 10 further comprising:
    training said LLM by also inputting at least one category monitored by an IDPS engine of said first ECU.

12. A method as recited in claim 8 further comprising:
    storing said generated IDPS rule in said IDPS engine of said second ECU.

13. A method as recited in claim 8 wherein said prompting further includes an instruction to minimize the overhead on said second ECU.

14. A method as recited in claim 8 further comprising:
    inputting, along with said second TARA configuration, at least one IDPS rule of said second ECU.

15. A method of generating intrusion detection and prevention system (IDPS) rules for one of two electronic control units (ECUs) of a connected vehicle, said method comprising:

training a large language model (LLM) by inputting into said LLM a first threat assessment and remediation analysis (TARA) configuration of a first ECU of said connected vehicle and an electronic and electrical architecture (EEA) specification of said vehicle;

inputting a second TARA configuration of a second ECU of said connected vehicle and a third TARA configuration of a third ECU of said connected vehicle into said LLM and prompting said LLM to generate IDPS rules for said second ECU based upon said second and third TARA configurations; and outputting at least one IDPS rule generated by said LLM for said second ECU, said generated IDPS rules being appropriate for use by an IDPS engine of said second ECU.

16. A method as recited in claim 15 further comprising:
training said LLM by extracting a feature vector from said first TARA configuration and a feature vector from said EEA specification and inputting both feature vectors into said LLM.

17. A method as recited in claim 15 further comprising:
training said LLM by also inputting at least one IDPS rule from said first ECU into said LLM.

18. A method as recited in claim 17 further comprising:
training said LLM by also inputting at least one category monitored by an IDPS engine of said first ECU.

19. A method as recited in claim 15 further comprising:
storing one of said generated IDPS rules in said IDPS engine of said second ECU.

20. A method as recited in claim 15 wherein said prompting further includes an instruction to minimize the overhead on said second ECU.

* * * * *